United States Patent [19]

Hagenbuch et al.

[11] Patent Number: 5,249,843
[45] Date of Patent: * Oct. 5, 1993

[54] NO-BOUNCE TAILGATE ASSEMBLY

[76] Inventors: LeRoy G. Hagenbuch, 4602 N. Rosemead, Peoria, Ill. 61604; Richard Keller, R.R. 1, Box 47, Deer Creek, Ill. 61733; Jon Wren, R.R. 2, Manito, Ill. 61546

[*] Notice: The portion of the term of this patent subsequent to Dec. 29, 2009 has been disclaimed.

[21] Appl. No.: 955,318

[22] Filed: Oct. 1, 1992

Related U.S. Application Data

[63] Continuation of Ser. No. 798,016, Nov. 20, 1991, Pat. No. 5,174,632, which is a continuation of Ser. No. 544,041, Jun. 26, 1990, abandoned, which is a continuation of Ser. No. 309,025, Feb. 6, 1989, abandoned, which is a continuation of Ser. No. 71,816, Jul. 10, 1987, abandoned.

[30] Foreign Application Priority Data

Jul. 24, 1986 [AU] Australia ............................ 60592/86
Jul. 24, 1986 [CA] Canada .................................. 514603

[51] Int. Cl.⁵ .............................................. B60P 1/267
[52] U.S. Cl. .............................. 298/23 DF; 298/23 F; 298/235; 298/23 MD
[58] Field of Search ............... 298/23 R, 23 D, 23 S, 298/23 A, 23 F, 23 DF, 23 MD, 6; 296/184; 56/202-205

[56] References Cited

U.S. PATENT DOCUMENTS

| | | | |
|---|---|---|---|
| 731,783 | 6/1903 | Keller | 298/23 DF X |
| 757,278 | 4/1904 | Depew | 298/23 R X |
| 1,792,680 | 2/1931 | Dewey | 298/6 |
| 2,213,385 | 9/1940 | Dailey | 298/23 D |
| 2,410,046 | 10/1946 | Burns | 298/23 S |
| 2,683,545 | 7/1954 | Wood | 298/23 MD |
| 3,751,112 | 8/1973 | Hagenbuch | 298/23 DF |
| 4,348,055 | 9/1982 | Meisner et al. | 298/23 DF |
| 4,569,187 | 2/1986 | Spikes et al. | 298/23 F X |
| 4,621,858 | 11/1986 | Hagenbuch | 298/23 MD |
| 4,678,235 | 7/1987 | Hagenbuch | 298/23 DF |
| 4,826,233 | 5/1989 | Hagenbuch | 296/39.3 |
| 4,831,539 | 5/1989 | Hagenbuch | 364/449 |
| 4,839,835 | 6/1989 | Hagenbuch | 364/567 |
| 4,845,648 | 7/1989 | Hugenbuch | 364/567 |
| 5,174,632 | 12/1992 | Hagenbuch et al. | 298/23 MD |

FOREIGN PATENT DOCUMENTS

| | | |
|---|---|---|
| 209586 | 8/1956 | Australia . |
| 25457/77 | 5/1976 | Australia . |
| 2577180 | 8/1986 | France ........................... 298/23 F |
| 61-171633 | 8/1986 | Japan ........................... 298/23 S |
| 316594 | 1/1972 | U.S.S.R. ........................ 298/23 A |
| 164658 | 6/1921 | United Kingdom ......... 298/23 D |
| 595516 | 12/1947 | United Kingdom ........ 298/23 DF |

Primary Examiner—Michael S. Huppert
Assistant Examiner—Gregory A. Morse
Attorney, Agent, or Firm—Leydig, Voit & Mayer

[57] ABSTRACT

In a tailgate assembly, a locking mechanism for preventing rotation of the assembly in response to a torque generated by a moment arm of the tailgate assembly and a force resulting from the jolting of the truck as it travels over rough terrain.

20 Claims, 11 Drawing Sheets

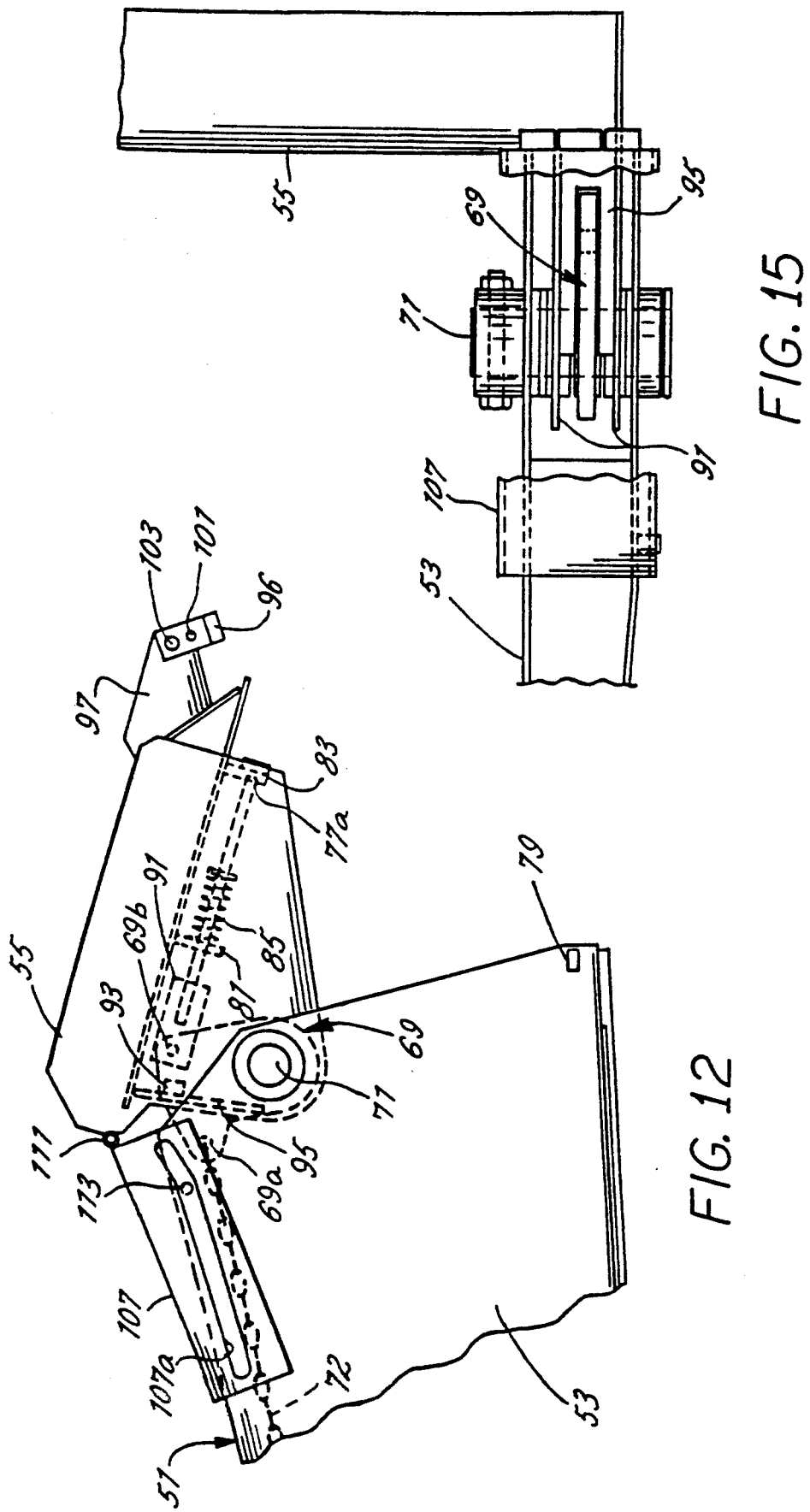

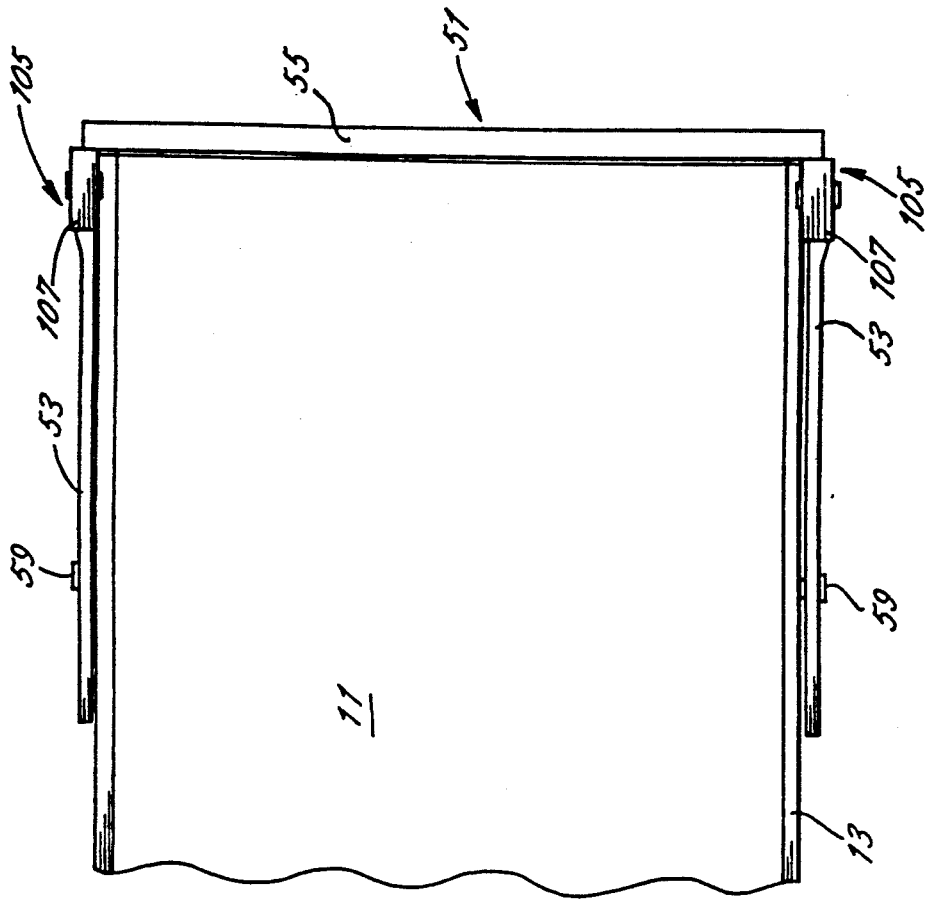
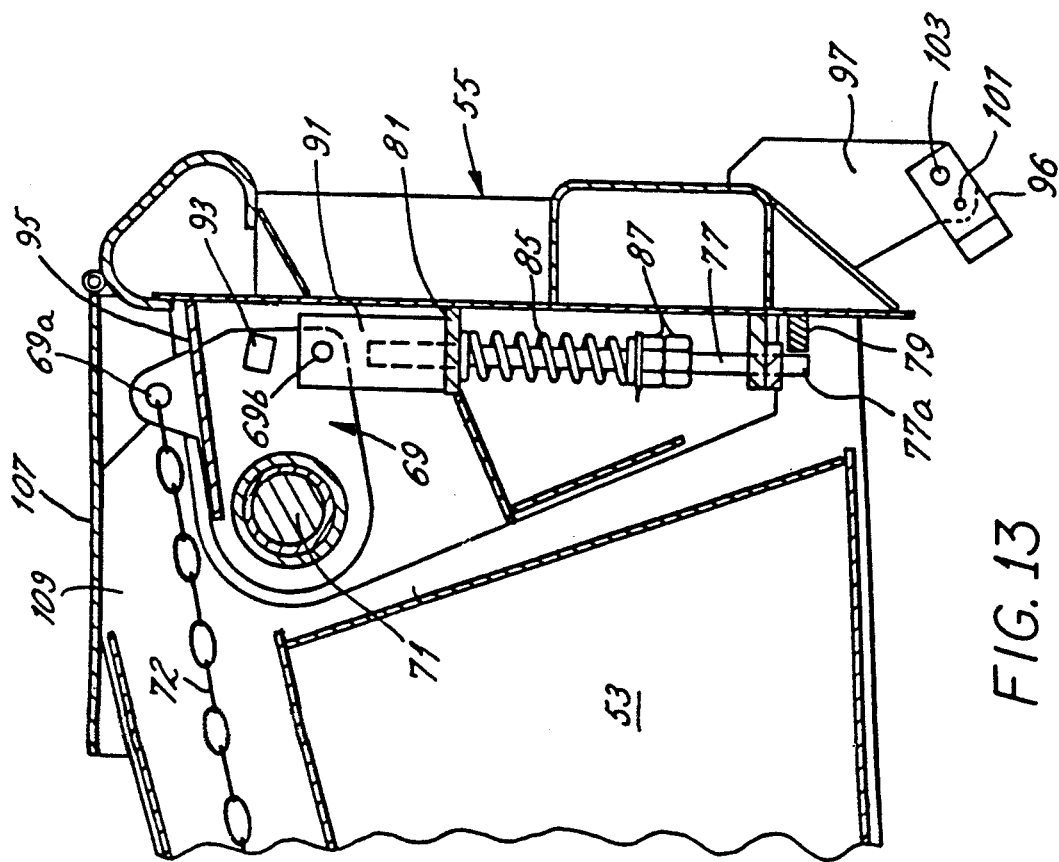
FIG. 14
FIG. 13

NO-BOUNCE TAILGATE ASSEMBLY

RELATED APPLICATIONS

This application is a continuation of application Ser. No. 07/798,016, filed on Nov. 20, 1991 and which issued as U.S. Pat. No. 5,174,632 on Dec. 29, 1992, which is a continuation of application Ser. No. 07/544,041, filed on Jun. 26, 1990 (now abandoned), which is a continuation of application Ser. No. 07/309,025, field on Feb. 6, 1989 (now abandoned), which is a continuation of application Ser. No. 07/071,816, filed on Jul. 10, 1987 (now abandoned).

TECHNICAL FIELD

The invention generally relates to tailgate assemblies for off-road, heavy-duty trucks and more particularly relates to mechanisms for raising and lowering tailgates.

BACKGROUND

Because tailgate assemblies can be damaged by the difficult tasks performed by off-road, heavy-duty trucks, the bodies of the trucks have traditionally been designed to function without tailgates. But, as a result of a desire to increase capacity, tailgate assemblies have been designed which are capable of withstanding the harsh working environment of off-road trucks. For example, in U.S. Pat. No. 3,751,112 to Hagenbuch a tailgate assembly includes two side plates that are pivotally connected to the sides of the body. In order to raise the tailgate upon the pivoting of the body, a pair of outriggers mounted to the frame of the truck, secure one end of a pair of chains (or cables) which cause the tailgate to rotate when the body is dumped.

By providing outriggers, the chains or cables which rotate the tailgate are attached at a point on the frame which extends out beyond the side of the body. By attaching one end of the chains at the end of the outriggers, the chains are not biased around the bottom edge of the body, which would cause damage to both the chains and the truck body.

But, because the outriggers are a cantilever and extend from the frame to a point beyond the sides of the body, the outriggers may be plagued with problems under certain conditions. For instance, because of limited available space on the frames of some truck models, the area of the base of the outriggers (where they attach to the frame) may be smaller than desired. The strength of the outriggers may be compromised if the bases of the outriggers have areas too small for the outriggers to withstand the forces exerted at the ends of the outriggers as the tailgate is rotated when the body pivots. As a result of the area of the base being too small, the outriggers may be susceptible to bending after repeated use. Finally, some manufacturers of trucks are reluctant to honor warranties if the frame of the truck has been subjected to welding as is required to mount the outriggers for the addition of a tailgate assembly.

One attempt at eliminating the potential problems of the use of outriggers to raise tailgates has been to use a shortened outrigger which does not extend beyond the sides of the body. By shortening the outrigger, the weakening caused by cantilevering is reduced. Because these outriggers do not extend beyond the sides of the body, the chains (or cables) are biased against the bottom edge of the body. When the body is pivoted to a dump position, the chains move relative to the bottom edge of the body. In order to prevent damage of the body or the chains as the body pivots in dumping, an elongated roller is mounted on each side of the body in order to protect the truck body and reduce wear of the chain.

Each roller is elongated because, as the body pivots, the chain changes position along the length of the sides of the body. As a result, in addition to the roller rotating as the chain pulls the tailgate to a raised position, the chain also walks along the length of the roller as the relative positions of the chain and roller change. Because of frictional forces, the chain does not walk smoothly along the length of the roller; instead, it moves in a jerking motion caused by the friction between the roller and chain holding the chain in a stationary lateral position until movement of the body and tailgate cause an angle in the chain which creates sufficient force to overcome the friction. As the body continues to pivot, the forces created by the bending chain increase until they again overcome the friction and the chain snaps to a new position. This jerking movement is extremely hard on both the rollers, the chains, the outrigger, the tailgate and the truck frame. As a result, the rollers and chains wear out quickly.

To overcome the foregoing wear problem, it is known to use a cable connection instead of a chain. Because a cable is composed of multiple strands of wire, frictional forces between strands become substantial if the elongated rollers bend the cable at too great an angle. In order to reduce the angle, the shortened outriggers are provided. Although the amount of extension of these shortened outriggers reduces problems inherent in a cantilevered support off the truck frame, the problems remain.

A related problem of tailgate assemblies that often causes damage is the undesirable "bouncing" or rotation of the assembly in response to a torque created about the tailgate s rotational axis by a moment arm between the rear axle of the truck and the tailgate's center of gravity created in response to oscillation of the rear axle relative to the surface of the road. This bouncing or banging of the tailgate assembly on the body of the truck may cause damage, depending on the length of the moment arm and the condition of the road. For truck bodies that extend substantially beyond the rear axle of the truck, the lever arm is sufficiently great that even relatively smooth roads will cause banging of the tailgate assembly that may be damaging.

SUMMARY OF THE INVENTION

The primary objective of the invention is to provide a tailgate assembly that is immune from the rotational effects resulting from jolting of the truck as it travels over rough terrain.

Other objects and advantages will become apparent with reference to the following detailed description when taken in conjunction with the drawings.

The invention provides a locking mechanism for the tailgate of a dump-body truck that prevents uncontrolled rotation of the tailgate in response to jolting of the truck as it travels over rough roads or the like. The locking mechanism is responsive to rotation of the dump body for unlocking the tailgate from the body, thereby allowing the tailgate to be controllably rotated to an out-of-the-way position.

While the invention will be described in some detail with reference to a preferred embodiment, it is to be understood that it is not intended to limit the invention

BRIEF DESCRIPTION OF THE DRAWINGS

FIG. 12 is an enlarged and partial side view of the back portion of the truck body in FIG. 9, illustrating in phantom line the position of the back panel and its locking mechanism when the truck body is in its fully raised position;

FIG. 13 is an enlarged partial view of the rear portion of the tailgate assembly with the outside plate of the side panel removed in order to expose the locking mechanism for the back panel;

FIG. 14 is a plan view of the rear portion of the truck body and tailgate assembly; and FIG. 15 is an enlarged plan view of a corner of the tailgate assembly, partially cut away to expose the locking mechanism for latching the rear back of the tailgate assembly.

DETAILED DESCRIPTION OF THE PREFERRED EMBODIMENT

Figure 1:
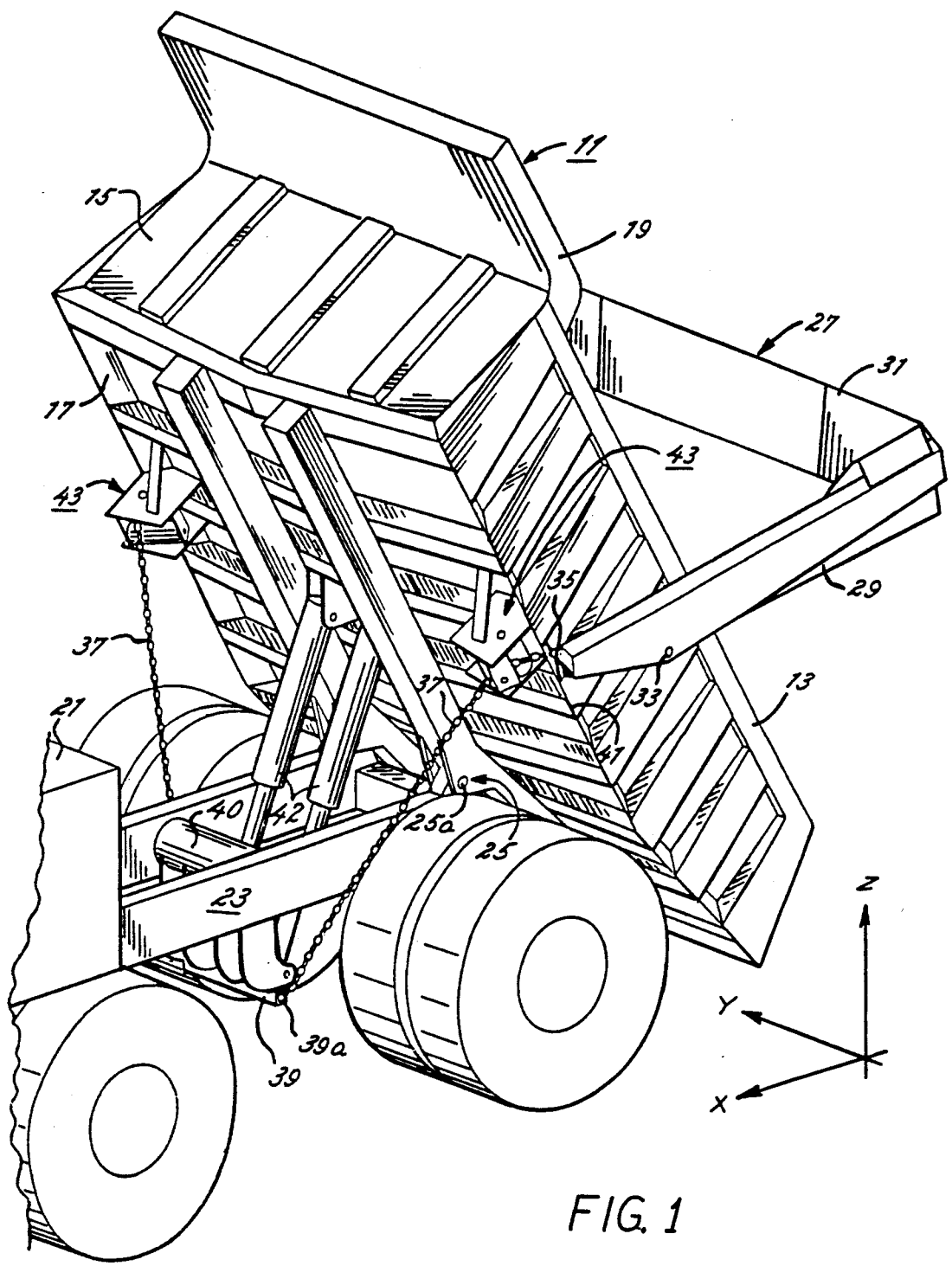
FIG. 1 is a perspective view of a heavy-duty, off-road truck with the body of the truck in its fully pivoted position in order to most clearly show the connecting mechanism for raising and lowering the tailgate assembly of the body.

Referring first to FIG. 1, there is shown the typical rear dump vehicle illustrated in the dump position. The rear dump vehicle includes a dump body 11 having a pair of side sheets 13 (one sheet shown only), a front sheet 15 and a bottom sheet 17. Furthermore, some rear dump vehicles include a canopy 19 coupled to the dump body 11. The canopy operates to protect a cab 21 when the rear dump vehicle is being loaded. The side sheets 13, the front sheet 15 and the bottom sheet 17 provide an open top wherein earth or other loaded material can be inserted in the dump body 11. The dump body 11 is generally connected to the main frame 23 by a body pivot assembly 25 so that the body can be rotated about a body pivot pin 25a for dumping the load.

Figure 2:
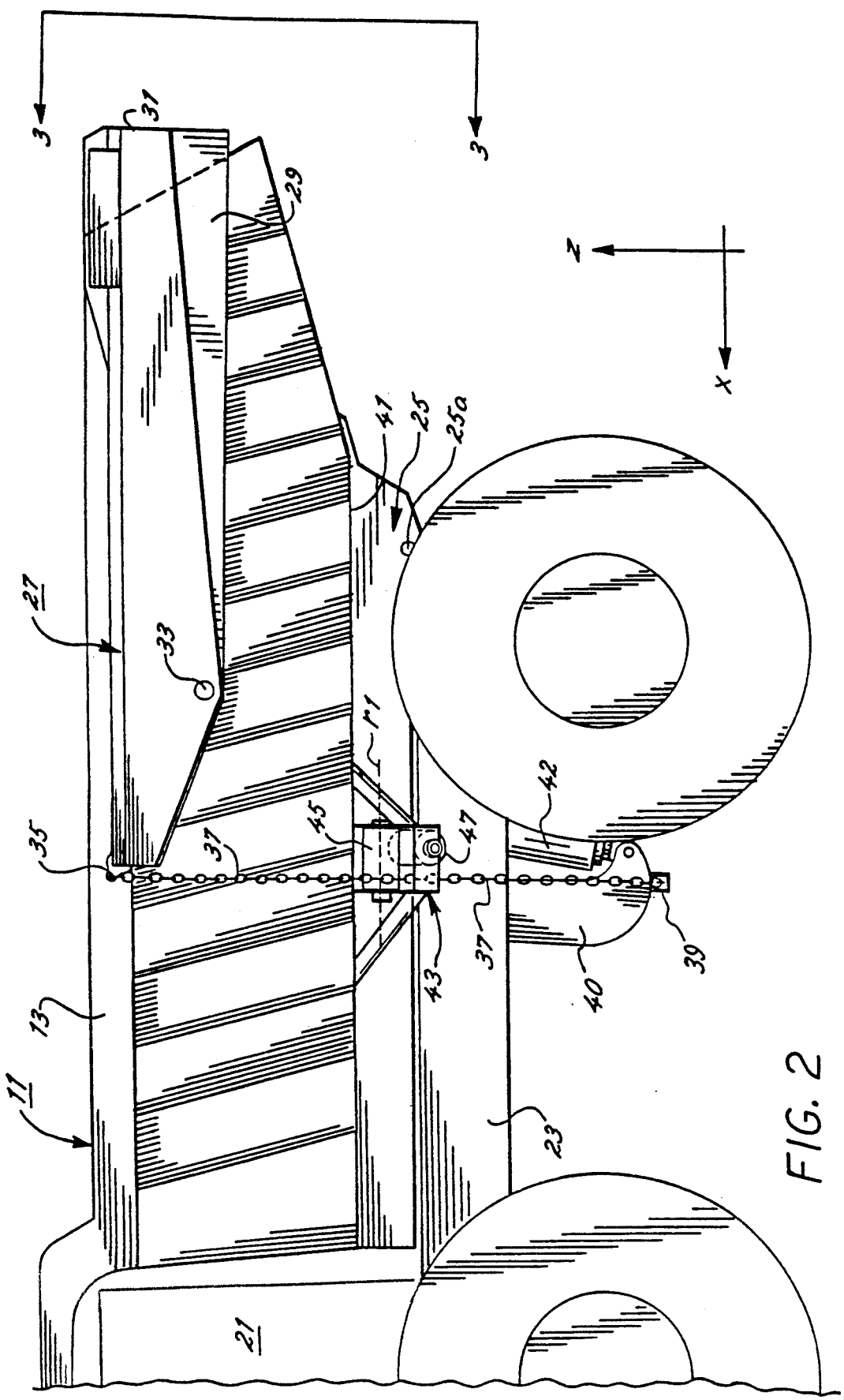
FIG. 2 is a side view of the truck showing the body in its fully lowered position in order to illustrate the position of a chain in a roller assembly of the connecting mechanism.

A tailgate assembly 27 is illustrated having a pair of side plates 29 (one of which is illustrated only) and a rear plate 31. The side plates 29 are pivotally connected to the side sheets 13 of the dump body 11 by a tailgate pivot pin 33. Consequently, the tailgate 27 can pivot about the pivot pin 33 to provide both a dump position (as shown in FIG. 1) and a load position (as shown in FIG. 2). The rear plate 31 of the tailgate 27 is illustrated in FIG. 2 as extending beyond the rear portions of the side sheets 13. Furthermore, the rear plate 31 is shown substantially perpendicular to a ground surface. Consequently, the rear plate 31 when in the load position provides an increased volume for the dump body 11 in which loaded material can be placed.

The forward edge of the side plates 29 of the tailgate assembly 27 have extension pieces 35 thereon which provide an anchor for a chain 37. At the opposite end of the chain 37, it is connected to an elongated mounting support 39. The mounting support 39 is in turn connected (e.g., bolted) to a base section 40 for the hoist cylinders 42. As an aid in describing relative movement of the dump body 11, the tailgate assembly 27 and the chain 37, a Cartesian coordinate system is illustrated with a Y-axis aligned parallel with the axis of rotation for the dump body and the X-axis parallel with the length of the vehicle. The Z-axis is substantially vertical with respect to the ground.

As the forward portion of the dump body 11 is raised by the hoist cylinders 42, the dump body is pivoted about the body pivot pin 25a. Pivoting of the dump body 11 causes the chain 37 to become taut and, as a result, exerts a torque on the side plate 29 which causes counterclockwise rotation of the tailgate assembly 27 about the pivot pin 33. As illustrated in FIG. 1, pivoting of the dump body 11 causes the rear plate 31 to rotate to a position which substantially clears the normal maximum load height of loaded material carried in the dump body. Consequently, any material on the bottom sheet 17 of the dump body 11 can be discharged beneath the rear plate 31 of the tailgate assembly 27 and through the rear portion of the side sheets 13.

The tailgate pivot pin 33 can be located at any desired position relative to the side plate 29 of the tailgate assembly 27 and the side sheets 13 of the dump body 11. However, a desired position for the tailgate pivot pin 33 is in a position which causes a slight raising of the rear plate 31 of the tailgate assembly 27 to an angle approximately 90° between the top of side sheets 13 and the top of side plate 29. A slight raising of the rear plate 31 provides increased clearance between the rear plate and the bottom sheet 17 for discharge of the loaded material. By placing the pivot pin 33 substantially forward from the rear of the side sheets 13 (as shown in FIG. 1), rotating motion of the surface of the rear plate 31 is upwardly and over the loaded material.

The mounting support 39 is preferably an elongated, square and hollow tubing (e.g., steel) which is secured to the lowermost portion of the base section 40 which anchors one end of each of the hoist cylinders 42. Although the mounting support 39 eliminates the need for outriggers, the chain 37 can no longer maintain a straight line in the Y-Z plane, as it could when an outrigger was present.

Figure 3:
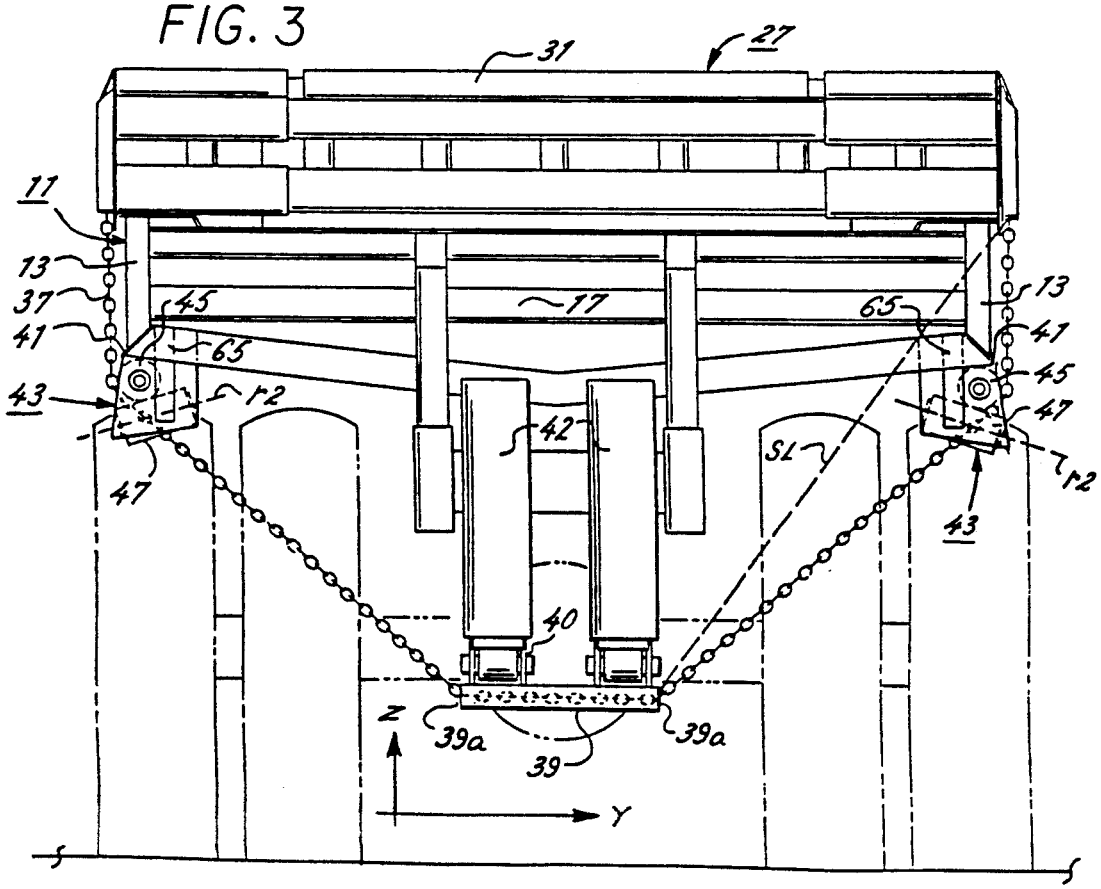
FIG. 3 is a rear view of the truck showing the body in its fully lowered position, taken along the line 3—3 in FIG. 2.

As best seen in FIG. 3, a straight line SL in the Y-Z plane connecting the extension piece 35 to the end 39a of the mounting support 39 cuts through the side walls 13 and the bottom 17. Therefore, the chain 37 must be biased around the edge 41 formed where the side 13 meets the bottom 17. In order to direct the chains 37 around their respective edges 41, a pair of roller assemblies 43 are mounted (e.g., welded) on the bottom sheet 17 and adjacent the edges 41 in order to engage the chains 37 and prevent scraping of the edges against the chains as they move relative to one another as the dump body 11 pivots.

Referring more particularly to FIGS. 2 and 3, in the lowered position of the dump body 11, each of the chains 37 describe a generally straight line in the X-Z plane (depending on the precise position of the roller assemblies 43) and an angled line in the Y-Z plane. The angling of the chain 37 in the Y-Z plane is provided by a cylindrical roller 45 in each of the roller assemblies 43 which causes the chain to be biased away from the edge 41. Because the roller 45 is mounted for rotation about an axis $r_1$ which is substantially transverse to the line formed by the chain 37 in the X-Z plane, pivoting of the dump body 11 will cause the roller 45 to rotate as the chain moves over the surface of the roller.

Each of the roller assemblies includes a second roller whose axis of rotation is approximately transverse to that of roller 45; when the chain is biased away from the edge 41 in the Y-Z plane by the roller 45 during pivoting of the dump body 11 and rotation of the tailgate assembly 27, the chain also is biased forward in the X-Z plane by the second roller so that the sliding of the chain along the length of the roller 45 is limited. Each of the second rollers is mounted in the roller assembly relative to the first roller 45 so as to engage the chain 37 as it begins to move laterally along the length of the surface of roller 45 in response to the pivoting of the dump body 11 and the rotation of the tailgate assembly 27. After the second roller engages the chain 37, further pivoting of the dump body 11 will cause the chain 37 to angle about the second roller in the X-Z plane. Because the chain 37 is biased forward, the first roller 45 is able to hold the chain away from the edge 41 without being of a substantially longer length. In addition, by limiting the amount of travel of the chain 37 along the length of the roller 45, the wear caused by such lateral movement is substantially reduced. Because the chain no longer catches and releases in response to the frictional dynamics of the chain moving laterally over an elongated roller as in the prior art, the raising and lowering of the tailgate assembly 27 in accordance with the invention is much smoother than previously possible in tailgate assemblies without outriggers.

Figure 4:
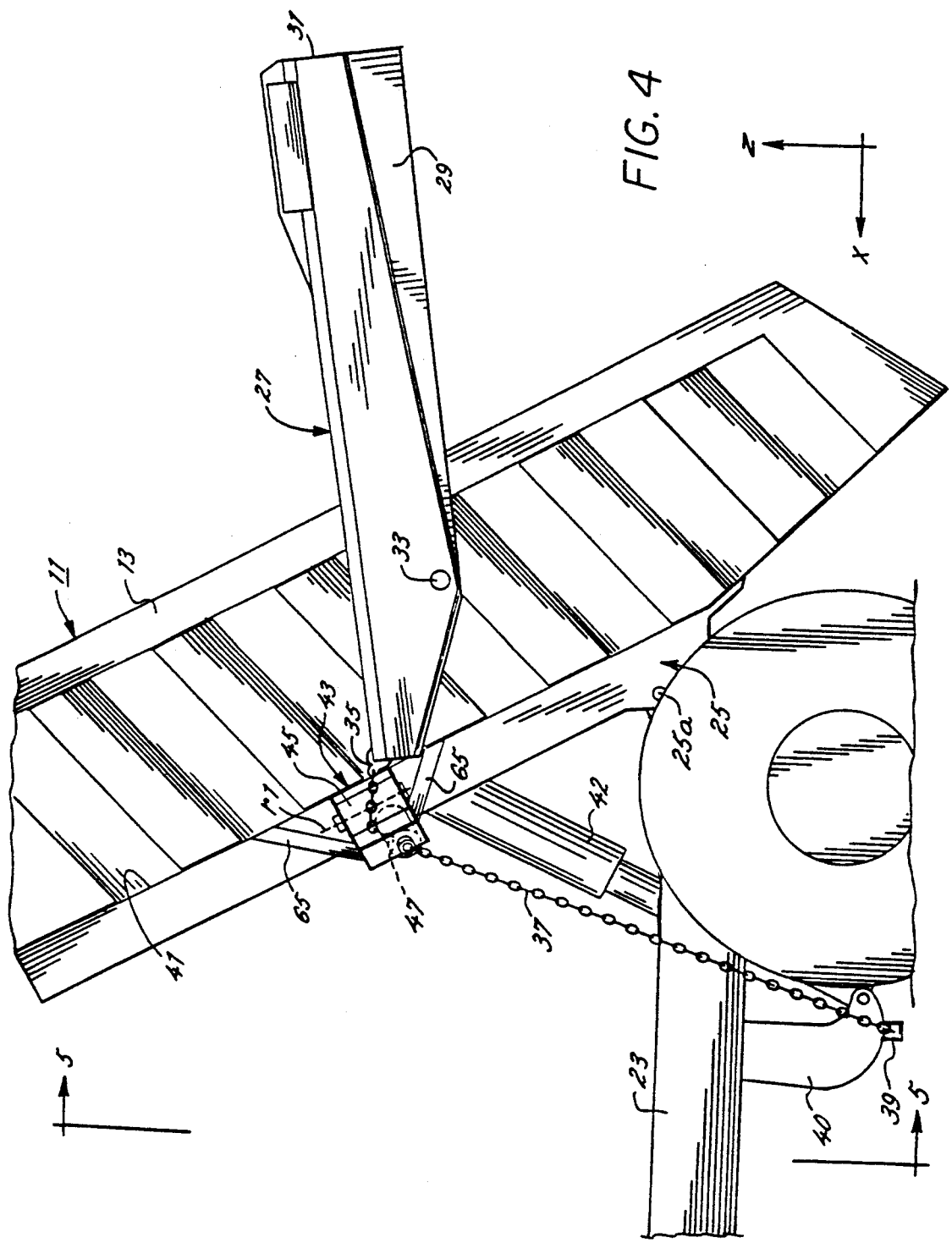
FIG. 4 is a side view of the body of the truck in a full pivoted position illustrating the position of the chain of the connecting mechanism of the invention compare to its position when the body is fully lowered as shown in FIGS. 2 and 3.

Viewing the dump body 11 from the side and in its lowered position as illustrated in FIG. 2, the chain 37 appears as aligned substantially in a straight line. Actually, the chain 37 is angled in the Y-Z plane about the edge 41 by the first roller 45, as best seen in FIG. 3, whose axis of rotation $r_1$ is in approximate parallel alignment with the edge 41. When the operator of the vehicle activates the hoist cylinders 42, the dump body 11 pivots, thereby causing the roller assembly 43 and the tailgate assembly 27 to rotate about the pivot pin 25a. As the dump body 11 pivots toward its dump position shown in FIGS. 4 and 5, the extension piece 35 moves relative to the roller assembly 43 and the mounting support 39.

Since the chain 37 remains taut as the dump body 11 pivots, it attempts to maintain a straight line between the extension piece 35 and the mounting support 39. In attempting to maintain such a straight line, the chain moves along the length of roller 45 as the relative positions of the extension piece 35 and mounting support 39 change. Because roller 47 is mounted for rotation about an axis $r_2$ that is transverse to the axis of rotation $r_1$ for roller 45, when the chain 37 reaches the surface of the roller 47 it is prevented from traveling further along the length of roller 45, and it is biased by the surface of the roller so that continued pivoting of the dump body 11 causes the chain 37 to rotate the roller as the chain becomes angled in the X-Z plane as well as the Y-Z plane.

Figure 6:
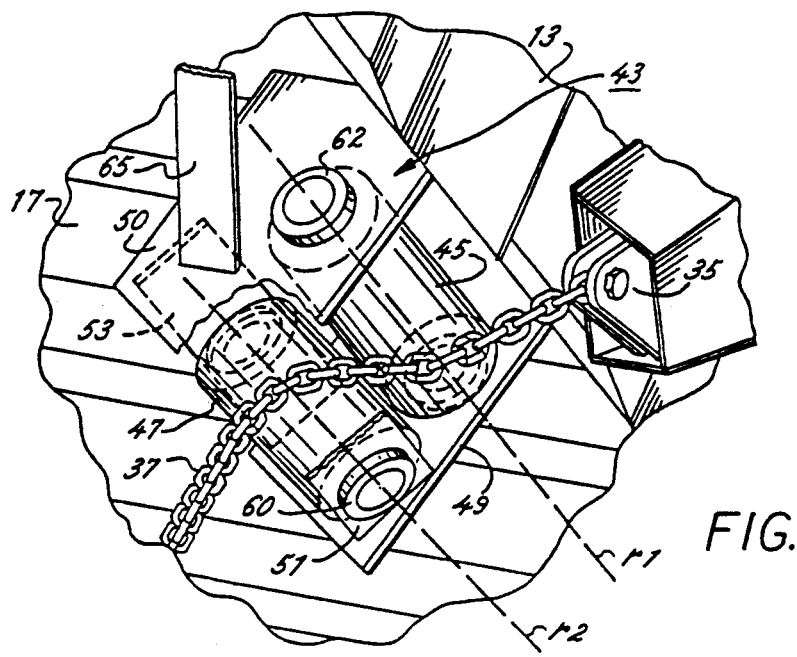
FIG. 6 is an enlarged perspective view of one of the two roller assemblies of the connecting mechanism with a portion of the assembly cut away to more clearly illustrate the relative positions of the pair of rollers in the assembly.

Referring to FIG. 6, each of the roller assemblies 43 includes first and second metal plates 49 and 50 which are mounted on the edges to the bottom sheet 17 of the truck body 11. At the free ends of the plates 49 and 50, metal cross members 51 and 53 brace the plates so as to provide a sturdy open box structure. Spanning plates 49 and 50, the journals of roller 45 are received by holes in the plates which are surrounded by bushings 62 (only one is shown) mounted on the outside surface of each of the plates. Likewise, roller 47 spans the opposing cross members 51 and 53 with its journals being received by holes in each of the cross members which are surrounded by bushings 60 mounted on the outside surface of the members. To further support the roller assembly 43, struts 65 (only one is shown in FIG. 2) extend from the outside of the plates 49 and 50 to the surface of the bottom sheet 17.

Each of the rollers 45 and 47 is constructed of large and small tubing concentrically positioned and capped at both ends by a donut-shaped metal piece. The foregoing construction creates a central bore through each roller 45,47 that receives an elongated rod that serves as a shaft about which the rollers rotate. The ends of the shafts serve as the journals which are received by the bushings 62 and 60. As a possible addition to the roller assembly, a layer of rubber may be vulcanized to its circumference in order to further improve the smoothness of the movement of the chain 37 over the surface of the roller.

The extension piece 35, roller assembly 43 and mounting support 39 may be moved relative to one another from their positions shown in the drawings in order to provide for varying degrees of tailgate rotation which maximizes the opening of the tailgate relative to the body. Because such repositioning may result in the chain 37 rubbing the plate 50 of the roller assembly 43, a third roller mounted in the assembly may prove necessary. By simply extending the length of the cross members 51 and 53 and the length of the roller 45, the third roller can be added which is supported by the cross members on the forward side of the chain 37. The third roller may have an axis of rotation parallel with the axis of rotation $r_2$ of the second roller 47.

Figure 5:
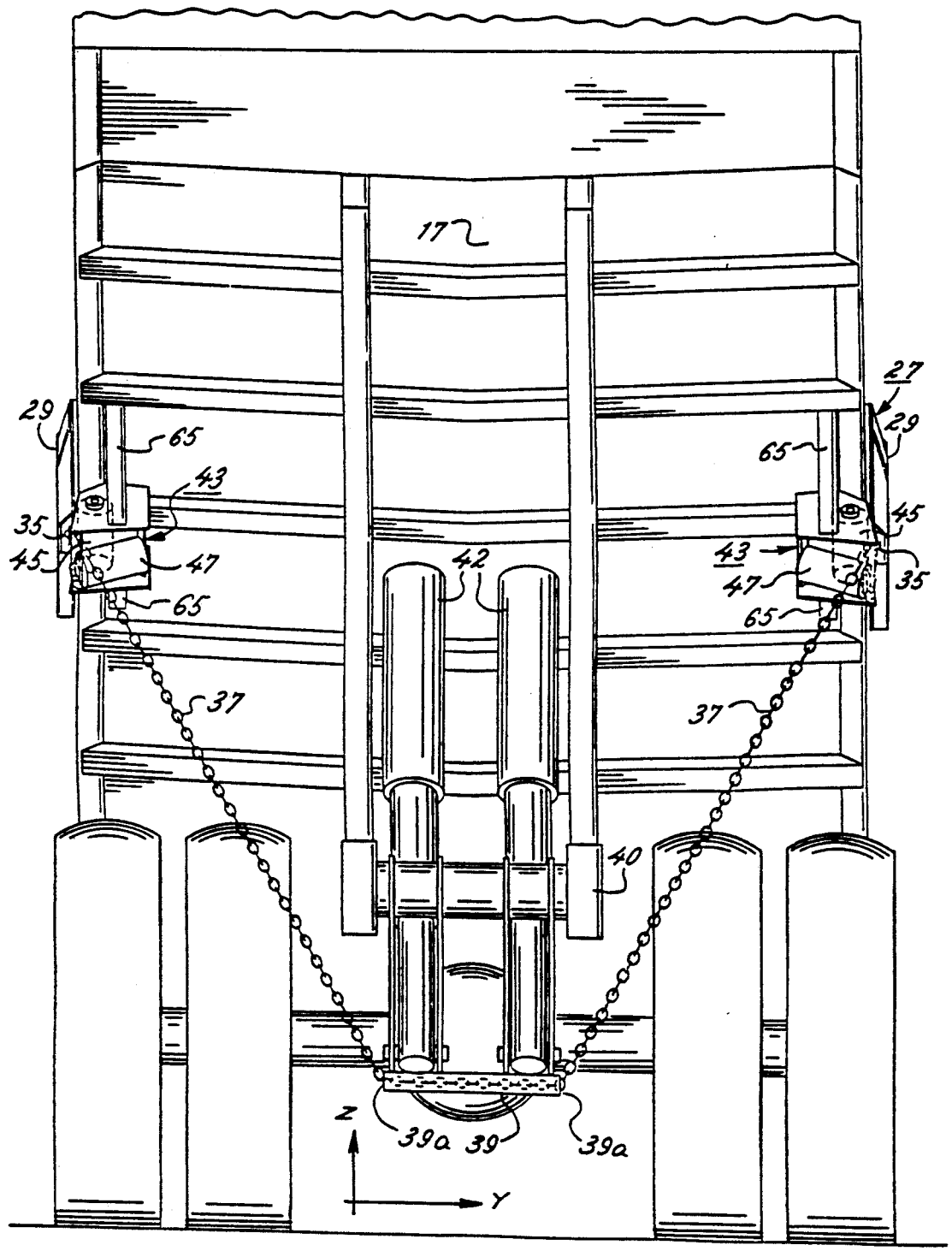
FIG. 5 is a front view of the fully pivoted body taken along the line 5—5 in FIG. 4.

The chain 37 may be a single continuous chain which reaches from one extension piece 35 to the other as best shown in FIGS. 3 and 5. For a continuous chain 37, the mounting 39 is preferably a conduit through which the chain passes. A single continuous chain 37 responds to changes in the tension of the chain on each side of the body resulting from uneven tilting of the body. If this happens, the distance between the ends 39 of the mounting support 39 and the extension pieces 35 will increase on one side and decrease on the other side. By making the chain 37 continuous, any shifting or tilting of the body 11 is compensated for by movement of the chain through the hollow of the support mounting 39.

If the chain 37 breaks, release of the chain's tension on both sides of the body can be avoided by limiting the chain's freedom of movement through the mounting support 39. For example, a short auxiliary chain may attach the chain 39 to the mounting support such that a break on one side will permit only a limited release of the tension on the opposing side because the auxiliary chain will hold the unbroken side to the mounting support.

The preferred way of implementing the chains 37 is to provide two separate chains whose ends are secured to the ends 39a of the mounting support 39 In order to attach the ends of each separate chain 37 to the ends 39a of the mounting support, the ends 39a are formed by welding a metal plate (not shown) over each end of the mounting support 39. Two support brackets (not shown) are positioned to be standing on end with the metal plate as their base. These support brackets receive a nut and bolt assembly that also receives the last link of the chain 37. Because the last link is sandwiched between the two support brackets, the nut and bolt assembly secures the end of the chain 37 to the mounting support 39.

Turning to FIGS. 7-15, often tailgate assemblies such as the one illustrated in FIGS. 1-5 are plagued by a problem of bouncing about their axes of rotation in response to movement of the truck over rough terrain. Sometimes, when the truck body is of a type where the tailgate extends substantially beyond the rear axle of the truck, this bouncing can be more than merely annoying. In fact, when the moment of the tailgate's center of gravity relative to the rear axle is sufficiently great, even small jolts to the axle from rough roads may cause the bouncing of the tailgate to be sufficiently severe that repeated travel over the rough roads will quickly damage the tailgate and body. In such situations, it is known to include cushioning materials on the surfaces upon which the tailgate rests in its lowered position in order to dampen out the bouncing of the tailgate assembly. Although this "solution" makes the bouncing less annoying and helps prevent serious damage to the tailgate assembly or the truck body, it does not address the underlying problem of bouncing caused by the moment of rotation generated by the jolting of the truck as it moves over rough hauling roads.

Figure 7:
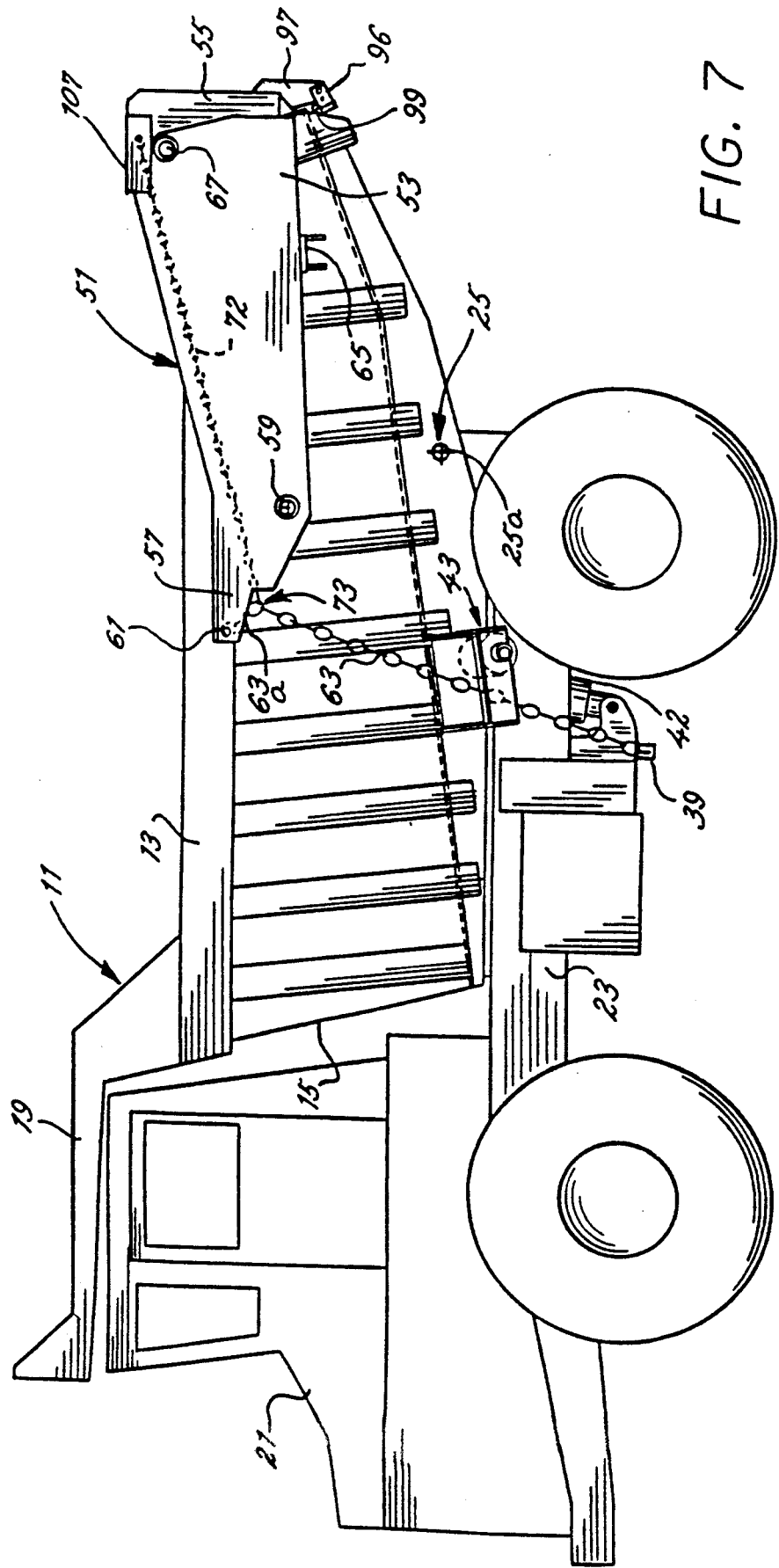
FIG. 7 is a side view of a heavy-duty, off-road truck, having the connecting mechanisms and including a locking mechanism according to the invention that eliminates uncontrolled rotation of the tailgate assembly.
Figure 8:
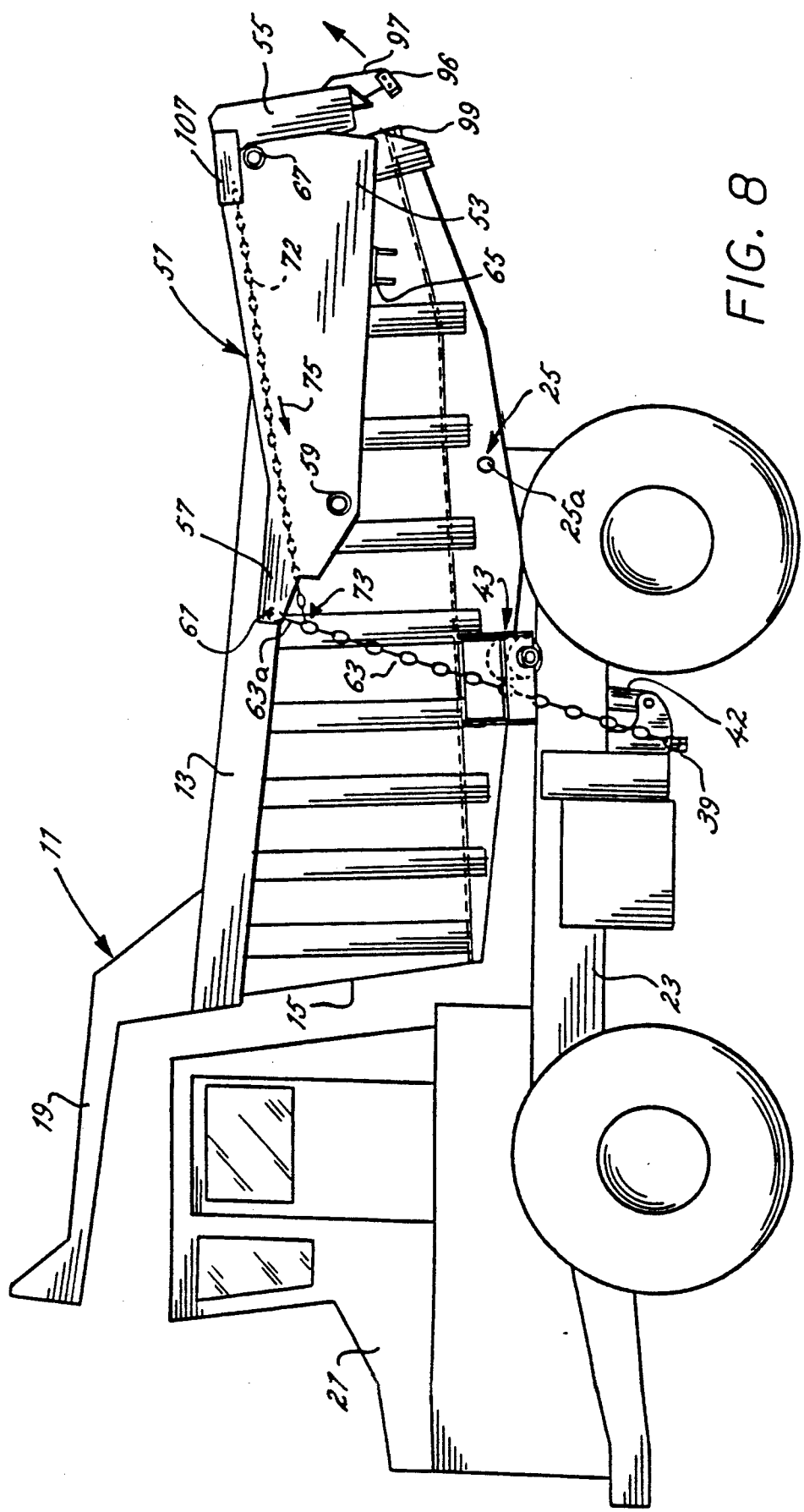
FIG. 8 is a side view of the truck shown in FIG. 7 with the body slightly rotated about its pivot axis in order to indicate the movement of the tailgate caused by the connecting mechanism in response to the initial rotation of the body.
Figure 9:
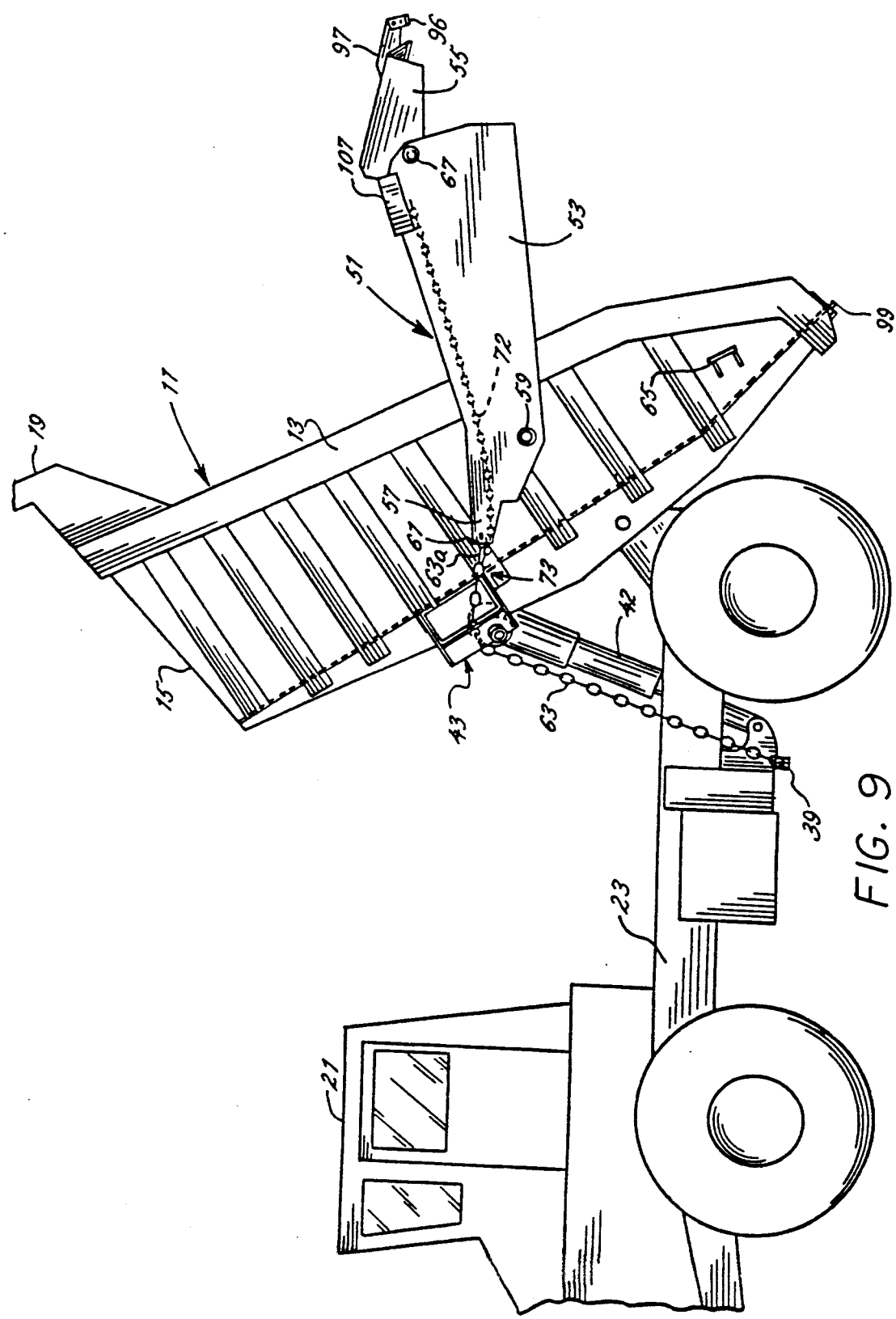
FIG. 9 is a side view of the truck shown in FIGS. 7 and 8 with the body rotated into its fully raised position in order to illustrate the fully opened position of the tailgate assembly.

Referring specifically to FIGS. 7-9, a tailgate assembly 51 includes two side panels 53 (only one of which is shown in FIG. 7) and a rear panel 55 for providing a back wall of the dump body 13 when the body is its lowered position as shown in FIG. 7. Inasmuch as only one side panel 53 is illustrated by the side views of FIGS. 7-9, only one side will be described in detail; but it will be understood that identical structure and function are associated with the side panel not shown.

An extension portion of each side panel 53 of the tailgate assembly 51 extends forward of an axis of rotation 59 and includes an anchor 61 for a chain 63 connecting the extension portion 57 to the frame 23 of the truck at the mounting support 39 by way of the roller assemblies 43. In its lowered position, the side panel 53 of the tailgate assembly 51 rests upon platform 65 mounted to the side sheet 13. It is these platforms that are typically provided with cushioning material to soften the blows to the body 13 caused by bouncing of the tailgate assembly 51. The back panel 55 of the tailgate assembly 51 is mounted between the two opposing and parallel side panels 53 so as to be rotatable about an axis 67.

In accordance with one important aspect of the invention, the tailgate assembly 51 includes a means for locking the back panel 55 into a fixed position relative to the side panels 53 when the tailgate assembly is in its fully lowered position as shown in FIG. 7 so that in conjunction with the locked position of the back panel 55, the entire tailgate assembly 51 is locked to the dump body 11 so as to prevent bouncing. The chain 63 is incorporated into a mechanism that responds to rotation of the dump body 11 about its pivot point 25a such that the locking means in the tailgate assembly first releases the back panel 55 for rotation about pivot axis 67. Such rotation causes the entire tailgate assembly 51 to be released from locked engagement with the dump body 11 so that continued rotation of the dump body to its fully raised position will allow the tailgate assembly to respond by rotating about its axis 59.

Figure 10:
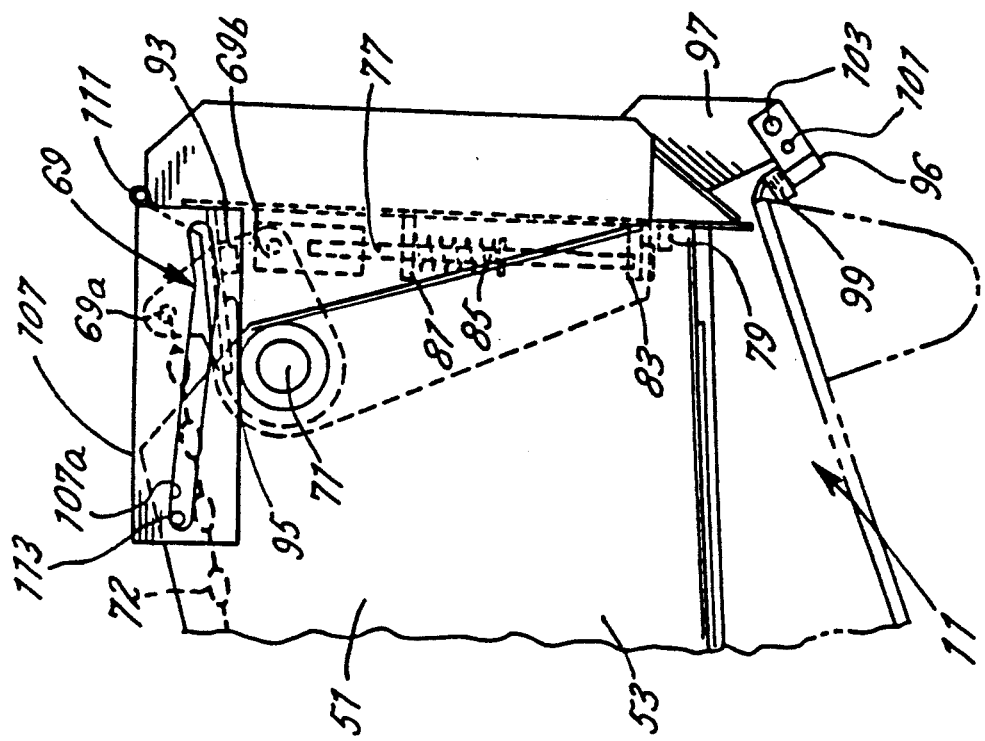
FIG. 10 is an enlarged and partial side view of the rear portion of the truck body in FIG. 7, illustrating in phantom line the position of the locking mechanism of the invention for latching a rear panel of the tailgate assembly to side panels of the assembly and to the body of the truck.

Referring to FIG. 7 in conjunction with FIG. 10, the locking means according to a preferred embodiment of the invention includes a bell crank 69 mounted to a pivot pin 71 defining the pivot axis 67 of the back panel 55. Attached to one projection 69a of the bell crank 69, is a first end of a chain extension 72 that extends from the bell crank to a junction 73 joining the chain 63 at an intermediate point so as to create a short link 63a extending from the anchor 61. This three-point suspension or Y-configuration of the inter-connected chains 63, 63a and 72 allows the interaction of the chains to provide the appropriate force on the bell crank 69 in response to rotation of the dump body 11. Specifically, as can be appreciated by comparing the position of the chains 63, 63a and 72 in FIGS. 7 and 8, initial rotation of the dump body 11 first causes the chain sections 63 and 63a to align without effecting rotation of the side panels 53. But, as a result of the alignment of the chain sections 63 and 63a, the chain section 72 is moved forward as indicated by the arrow 75 in FIG. 8.

Figure 11:
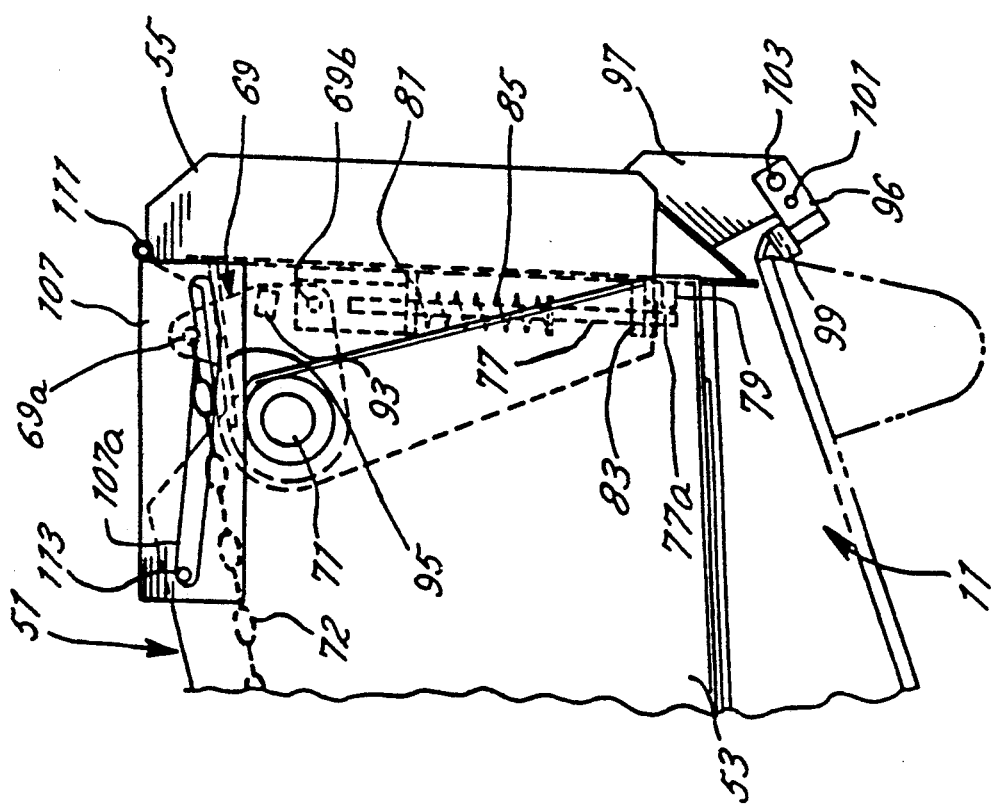
FIG. 11 is an enlarged and partial side view of the rear portion of the truck body in FIG. 8, illustrating in phantom line the position of the locking mechanism as it responds to the rotation of the truck body in order to free the lower portion of the back panel of the tailgate assembly and allow rotation of the panel about an axis of rotation orthogonal to the two, parallel side panels of the tailgate assembly.

Longitudinal movement of the chain section 72 in the forward direction causes the bell crank 69 to rotate counter-clockwise as indicated in FIG. 11 and, as a result, an elongated shaft 77 secured to a second projection 69b of the bell crank is moved upwardly along the longitudinal axis of the shaft.

In the rest position of the shaft 77 illustrated in FIG. 10, the lowermost end 77a of the shaft 77 extends in front of a stop 79 mounted to the side panel 53 of the tailgate assembly 51. The shaft 77 is mounted to the back panel 55 of the tailgate assembly 51 by way of a top bracket member 81 and a bottom bracket member 83 that are both rigidly secured to the inside wall of the back panel. By locating the stop 79 relative to the rest or locking position of the shaft 77 as illustrated in FIGS. 10 and 13, any attempted rotation of the back panel 55 causes engagement of the stop 79 with the lowermost end 77a of the shaft 77. Thus, the back panel 53 cannot rotate when the shaft 77 is in its rest position. Each of the brackets 81 and 83, include central openings that freely receive the body of the shaft 77.

The cut away view of the locking mechanism shown in FIG. 13 more clearly illustrates the construction of the mechanisms associated with the elongated shaft 77 and the interaction of the lowermost extension 77a of the shaft with the stop 79. In order to bias the shaft 77 in its rest or locking position, a coiled spring 85 is fitted over the elongated shaft 77 and is held between the first bracketing member 81 and a pair of threaded nuts 87 mounted to the shaft and including a washer 89 that serves as a base or platform for the spring. As the dump body 11 is raised, the chain 72 moves forward, the bell crank 69 rotates, the shaft 77 is lifted and the spring 85 is compressed. Upon lowering of the dump body 11, the compressed spring 85 will force the shaft 77 to extend downwardly and lock the back panel 55 to the side panels 53. In order to allow the bell crank 69 to pivot relative to the uppermost end of the shaft 77, a bracketing member 91 spans the distance between the top of the shaft 77 and the bell crank portion 69b.

Rotation of the dump body 11 toward its fully raised position causes a stop 93 to engage an extension 95 (as seen in FIGS. 11,12) that is secured to the inner wall of the back panel 55. As the dump body 11 continues to rotate toward its fully raised position, the engagement of the stop 93 with the extension 95 results in rotation of the back panel 55 in response to further rotation of the bell crank 69 and the dump body. Because of the three-point suspension of the chain 63, 63a and 72, the forward movement of the chain 72 will become less responsive to rotation of the dump body 11 as the tailgate assembly 51 moves the chain section 72 more closely into a linear alignment with the chain section 63a.

In order to lock the tailgate assembly 51 to the dump body 13, a flange 96 is mounted to a protruding member 97 of the back panel 55 for engagement with a complementary flange 99 mounted to the back edge of the dump body 11. As can be seen from FIGS. 10, 11 and 12, the tailgate assembly 51 is prevented from freely rotating relative to the dump body 11 by the engagement of the complementary flanges 96 and 99. Furthermore, the platform 65 (shown in FIGS. 7-9) defines the resting position for the tailgate assembly 51 relative to the dump body 11 so that there is virtually no play between the tailgate assembly and the dump body when the flanges 96 and 99 are engaged. As a safety feature, the flange 96 mounted to the protruding member 97 includes two mounting pins 101 and 103. Pin 101 is intended as a shear pin so that failure of proper operation of the locking mechanism upon rotation of the dump body, will only result in the shearing of the shear pin and, as a result, the rotation of the flange 96 about pin 103 so as to swing the flange away from the flange 99 and thereby free the tailgate assembly 51 for rotation.

Referring to FIGS. 14 and 15, the locking mechanism generally indicated as 105 in FIG. 14, is mounted inside a hollow area defined by the opposing metal sheets forming each side panel 53 of the tailgate assembly 51. In order to protect the locking mechanism 105 from contamination by dust, dirt and rocks, a protective cover plate 107 is mounted over the locking mechanism in order to close an opening 109 (see FIG. 13) in the top of the side panel 53 for allowing access to the locking mechanism 105. In order for the protective cover 107 to cooperate with the rotating of the back panel 55, the cover is hinged to the back panel at hinge assembly 111 best seen in FIGS. 10-13.

The protective cover 107 is characterized by an inverted "U"-cross-sectional shape that fits over the top of the side panel 53 and includes a slot 107a on the side of each of the side walls of the protective cover. The recess 107a receives a pin 113 in order to support the protective cover 107 on the side panel 53. Rotation of the back panel 55 causes the protective cover 107 to move forward following the motion dictated to it by the interaction of the slot 107a and the pin 113, thereby providing for easy forward and backward movement of the protective cover in response to rotation of the back panel 55.

From the foregoing, it will be appreciated that the connecting mechanism of the invention provides an effective means for raising and lowering a tailgate assembly for heavy-duty, off-road trucks without necessitating the use of an outrigger. Furthermore, the dual-roller assembly 43 allows the chain 37 or 63 to easily move relative to the dump body 11 without jumping and without requiring cumbersome accessory equipment in lieu of outriggers. Also, the particular tailgate assembly 51 illustrated in FIGS. 7-15 cooperates with the connecting mechanism so as to provide a tailgate assembly that is free of the damaging effects caused by bouncing of the tailgate assembly in response to jolting of the truck as it travels over rough roads.

We claim:

1. An apparatus for securing and locking a tailgate assembly with a dump body, the dump body having a bottom sheet, two side sheets, and a front sheet for carrying a load and pivotally mounted on a truck frame for rotation about a first axis between load and dump positions, the apparatus comprising:

a tailgate assembly pivotally mounted to the dump body and comprising two opposing and parallel rigid side panels having first and second ends, the first ends are pivotally mounted to the side sheets of the dump body for rotation about a second axis of rotation, a rigid back panel spanning the distance between the second ends of the side panels and forming a rear wall of the dump body is pivotally mounted to pivots on each of the second ends of the side panels for rotation about a third axis that passes through each of the pivots;

lifting means for rotating the dump body between lowered and raised positions;

the back panel having locking means movable between a first position preventing rotation of the back panel about the third axis of rotation and a second position permitting rotation of the back panel about the third axis; and compound action means for linking the frame to the side panels and the side panels to the back panel and for responding to the rotation of the dump body toward the raised position by first moving the locking means from the first position to the second position, and then rotating the side and back panels against the force of gravity about the second and third axes of rotation, respectively.

2. An apparatus as set forth in claim 1 wherein the compound action means comprises at least one three-sectioned chain connected in a Y-configuration wherein the chain has three ends with a first end anchored to the frame, a second end anchored to at least one of the side panels and a third end anchored to the locking means.

3. An apparatus as set forth in claim 1 wherein the back panel includes a flange extending from a lowermost portion of the back panel and mating in locked engagement with a flange extending from the dump body such that the flanges are in the locked engagement when the dump body is in its lowered position, thereby preventing any undesired rotation of the tailgate assembly caused by torque created by jolting of the truck.

4. An apparatus as set forth in claim 3 wherein rotation of the back panel by the compound action means disengages the flanges and frees the tailgate assembly for rotation about the second axis of rotation.

5. An apparatus as set forth in claim 2 wherein the bottom sheet meeting each of the side sheets at junctions forming edges, the apparatus further comprising:
 a pair of roller assemblies each mounted on the dump body;
 one section of chain joins the tailgate assembly to the frame whereby the one section is biased away from the edges by the roller assembly in a manner so as to create angles in the one section that lie approximately in a first plane that is substantially transverse to a second plane which is substantially parallel with the side walls;
 the one section responding to the pivoting of the dump body by generating a torque on the tailgate assembly, thereby causing rotation of the tailgate assembly about the second axis of rotation; and
 each of the roller assemblies including means for angling the one section in the second plane as the dump body pivots and the tailgate assembly rotates so that the one section is biased along the length of the associated edge by the angling means to limit repositioning of the compound action means along the length of the edge as the dump body pivots and the tailgate assembly rotates.

6. An apparatus as set forth in claim 5 wherein each of the roller assemblies comprises:
 a first cylindrical roller mounted in the assembly for rotation about a fourth axis substantially parallel with the associated edge, the first roller biasing the one section so as to be angled in the first plane; and
 the means for angling the one section in the second plane comprising a second cylindrical roller mounted in the assembly for rotation about a fifth axis substantially transverse to the fourth axis, the second roller biasing the one section so as to be angled in the second plane.

7. An apparatus for securing a tailgate assembly with a dump body, the dump body having a bottom sheet, two side sheets, and a front sheet for carrying a load and pivotally mounted on a truck frame for rotation about a first axis between load and dump positions, the apparatus comprising: p1 a tailgate assembly pivotally mounted to the dump body and comprising two opposing and parallel rigid side panels having first and second ends, the first ends are pivotally mounted to the side sheets of the dump body for rotation about a second axis of rotation, a rigid back panel spanning the distance between the second ends of the side panels and forming a rear wall of the dump body is pivotally mounted to pivots on each of the second ends of the side panels for rotation about a third axis that passes through each of the pivots;
 lifting means for rotating the dump body between lowered and raised positions; and
 compound action means for linking the frame to the side panels and the side panels to the back panel and for responding to the rotation of the dump body between the lowered and raised positions and for rotating the side panels against the force of gravity about the second axis of rotation and also rotating the back panel against the force of gravity about the third axis of rotation in response to the rotation of the dump body.

8. An apparatus as set forth in claim 7 including a means for supporting the side panels when the dump body is in the lowered position so as to register the tailgate assembly to the dump body.

9. An apparatus as set forth in claim 7 wherein the compound action means includes a linkage member extending from the frame to a forward part of the side panels and from the forward part to a rearward part of the side panels.

10. An apparatus as set forth in claim 9 wherein the compound action means include a three-sectioned chain connected in a Y-configuration, the chain having three ends with a first end anchored to the frame, a second end anchored to the forward of at least one of the side panels and a third end anchored to the back panel.

11. An apparatus as set forth in claim 9 comprising means for locking the back panel to prevent rotation of the back panel about the third axis when the dump body is in the lowered position.

12. An apparatus as set forth in claim 11 including means responsive to the rotation of the dump body for releasing the means for locking the back panel so as to allow the compound action means to rotate the back panel against the force of gravity about the third axis.

13. An apparatus for securing and locking a tailgate assembly with a dump body, the dump body having a bottom sheet, two side sheets, and a front sheet for carrying a load and pivotally mounted on a truck frame for rotation about a first axis between load and dump positions, the apparatus comprising:
 a tailgate assembly pivotally mounted to the dump body and comprising two opposing and parallel rigid side panels having first and second ends, the first ends are pivotally mounted to the side sheets of the dump body for rotation about a second axis of rotation, a rigid back panel spanning the distance between the second ends of the side panels and forming a rear wall of the dump body is pivotally mounted to pivots on each of the second ends of the side panels for rotation about a third axis that passes through each of the pivots;
 lifting means for rotating the dump body between lowered and raised positions;
 the back panel having locking means movable between a first position preventing rotation of the back panel about the third axis of rotation and a second position permitting rotation of the back panel about the third axis;
 the locking means having a shaft slidably mounted to the back panel and brackets rigidly mounted to the back panel and the dump body, each bracket having a central opening which are aligned with each other in the first position for receiving the shaft to register the back panel to the dump body; and compound action means for linking the frame to the side panels and the side panels to the back panel and for responding to the rotation of the dump body toward the raised position by first moving the locking means from the first position to the second position, and then rotating the side and back panels against the force of gravity about the second and third axes of rotation, respectively.

14. An apparatus for securing a tailgate assembly with a dump body, the dump body having a bottom sheet, two side sheets, and a front sheet for carrying a load and pivotally mounted on a truck frame for rotation about a first axis between load and dump positions, the apparatus comprising:

a tailgate assembly pivotally mounted to the dump body and comprising two opposing and parallel rigid side panels having first and second ends, the first ends are pivotally mounted to the side sheets of the dump body for rotation about a second axis of rotation, a rigid back panel spanning the distance between the second ends of the side panels and forming a rear wall of the dump body is pivotally mounted to pivots on each of the second ends of the side panels for rotation about a third axis that passes through each of the pivots;

a lift for rotating the dump body about the first axis between the load and dump positions; and a continuous linkage having first and second portions wherein the first portion connects the frame and the side panels of the tailgate assembly to rotate the tailgate assembly in response to rotation of the dump body between the load and dump positions and the second portion connects the first portion and the back panel to rotate the back panel in response to rotation of the dump body between the load and dump positions and during rotation of the tailgate assembly.

15. An apparatus as set forth in claim 14 comprising the back panel having a lock movable between a first position preventing the back panel from rotating about the third axis and a second position permitting the back panel to rotate about the third axis.

16. An apparatus as set forth in claim 15 wherein the linkage comprises at least one three-section chain connected in a Y-configuration wherein the chain has three ends with a first end anchored to the frame, a second end anchored to at least one of the side panels and a third end anchored to the lock.

17. An apparatus as set forth in claim 14 wherein the back panel includes a flange extending from a lowermost portion of the back panel and mating in locked engagement with a flange extending from the dump body such that the flanges are in the locked engagement when the dump body is in its lowered position, thereby preventing any undesired rotation of the tailgate assembly caused by torques created by jolting of the truck frame.

18. An apparatus as set forth in claim 17 wherein rotation of the back panel by the linkage disengages the flanges and frees the tailgate assembly for rotation about the second axis of rotation.

19. An apparatus as set forth in claim 16 wherein the bottom sheet meeting each of the two side walls at junctions forming edges, the apparatus further comprising:

at least one pair of roller assemblies mounted on the dump body adjacent one of the edges;

one section of the chain joins the tailgate assembly to the frame whereby the one section is raised away from one of the edges by the roller assembly in a manner so as to create angles in the one section that lie approximately in a first plane that is substantially transverse to a second plane, which is substantially parallel with the side walls;

the one section responding to the pivoting of the dump body by generating a torque on the tailgate assembly, thereby causing rotation of the tailgate assembly about the second axis of rotation; and each of the roller assemblies including means for angling the one section as the dump body pivots and the tailgate assembly rotates so that the one section is biased along the length of the associated edge by the angling means to limit repositioning of the linkage along the length of the edge as the dump body pivots and the tailgate assembly rotates.

20. An apparatus as set forth in claim 19 wherein each of the roller assemblies comprises:

a first cylindrical roller mounted in the assembly for rotation about a fourth axis substantially parallel with the associated edge, the first roller biasing the one section so as to be angled in the first plane; and the means for angling the one section in the second plane comprising a second cylindrical roller mounted in the assembly for rotation about a fifth axis substantially transverse to the fourth axis, the second roller biasing the one section so as to be angled in the second plane.

* * * * *